United States Patent [19]
Kubota et al.

[11] Patent Number: 6,026,434
[45] Date of Patent: Feb. 15, 2000

[54] DATA TRANSMISSION PROCESSING SYSTEM

[75] Inventors: Tatsuya Kubota; Norio Wakatsuki, both of Kanagawa, Japan

[73] Assignee: Sony Corporation, Tokyo, Japan

[21] Appl. No.: 08/849,708

[22] PCT Filed: Oct. 11, 1996

[86] PCT No.: PCT/JP96/02959

§ 371 Date: Sep. 22, 1997

§ 102(e) Date: Sep. 22, 1997

[87] PCT Pub. No.: WO97/14250

PCT Pub. Date:Apr. 17, 1997

[30] Foreign Application Priority Data

Oct. 11, 1995 [JP] Japan .................................... 7-263228

[51] Int. Cl.$^7$ ...................................................... H04N 7/10
[52] U.S. Cl. ............................ 709/217; 348/12; 348/722
[58] Field of Search ................................. 345/6, 7, 8, 10, 345/12, 13, 722, 327, 320; 709/217, 218, 219

[56] References Cited

FOREIGN PATENT DOCUMENTS 0 712 250  5/1996  European Pat. Off. .
8-191330  7/1996  Japan .
8-214267  8/1996  Japan .
8-279923  10/1996  Japan .

*Primary Examiner*—Nathan Flynn
*Attorney, Agent, or Firm*—Frommer Lawrence & Haug, LLP.; William S. Frommer

[57] ABSTRACT

Remote editing is carried out between video apparatuses connected via a communication network without producing deviation between transmitted audio and/or video and time code data. An editing machine 18 outputs a time code sense command to a terminal equipment 12, and the terminal equipment 12 multiplexes the time code sense command in a transmission packet and transmits the same to a terminal equipment 42 via a communication network 30. The terminal equipment 42 receives the transmission packet, demultiplexes the time code sense command, and outputs the same to a VTR apparatus 46. The VTR apparatus 46 outputs the audio and/or video data and the time code data to the terminal equipment 42 according to the control data. The terminal equipment 42 multiplexes the audio and/or video data and time code data input from the VTR apparatus 46 in the transmission packet and transmits the same to the editing system 10.

4 Claims, 6 Drawing Sheets

CONFIGURATION OF EDITING SYSTEM

FIG. 4

| BYTE NUMBER | | | | | | | | | | |
|---|---|---|---|---|---|---|---|---|---|---|
| 3 | TRS (FFh,00h,00h) | | LSB | | | | | | | MSB |
| 1 | RTS1 | | b0 | b1 | b2 | b3 | b4 | b5 | V | V |
| 1 | RTS2 | | b0 | b1 | b2 | b3 | b4 | b5 | V | V |
| 1 | LNID1 | | FN | | | | LN (1~31) | | | |
| 2 | LN1 | | b0 | b1 | b2 | b3 | b4 | $\overline{b4}$ | / | / |
|   |   | | b5 | b6 | b7 | b8 | b9 | $\overline{b9}$ | / | / |
| 1 | LNID2 | | FN | | | | LN (1~31) | | | |
| 2 | LN2 | | b0 | b1 | b2 | b3 | b4 | $\overline{b4}$ | / | / |
|   |   | | b5 | b6 | b7 | b8 | b9 | $\overline{b9}$ | / | / |
| 1 | FLAG | | PT | | | | Sb0 | Sb1 | Sb2 | Sb3 |
| 1 | RS422-ch1 | | b0 | b1 | b2 | b3 | UL | $\overline{UL}$ | V | / |
| 1 | RS422-ch2 | | b0 | b1 | b2 | b3 | UL | $\overline{UL}$ | V | / |
| 1 | VOICE | | b0 | b1 | b2 | b3 | UL | $\overline{UL}$ | 8F1 | 8F2 |
| 1 | RESERVE | | b0 | b1 | b2 | b3 | UL | $\overline{UL}$ | V | / |
| 2 | CRCC1 | | b0 | b1 | b2 | b3 | b4 | b5 | b5 | $\overline{b5}$ |
|   |   | | b7 | b8 | b9 | b10 | b11 | b12 | b13 | $\overline{b13}$ |
|   | ANC (a) | LOWER BYTE | | | | | | | | |
|   |   | UPPER BYTE | | | | | | | | |
| 2 | CRCC2 | | b0 | b1 | b2 | b3 | b4 | b5 | b5 | $\overline{b5}$ |
|   |   | | b7 | b8 | b9 | b10 | b11 | b12 | b13 | $\overline{b13}$ |
|   | VIDEO (b) | LOWER BYTE | | | | | | | | |
|   |   | UPPER BYTE | | | | | | | | |
| 2 | CRCC3 | | b0 | b1 | b2 | b3 | b4 | b5 | b5 | $\overline{b5}$ |
|   |   | | b7 | b8 | b9 | b10 | b11 | b12 | b13 | $\overline{b13}$ |

8 BITS

DATA TRANSMISSION PROCESSING SYSTEM

BACKGROUND OF THE INVENTION

1. Field of the Invention

The present invention relates to a data transmission processing system in which audio data and video data or one of the same (hereinafter referred to as "audio and/or video data") and time code data are multiplexed in a same transmission packet and transmitted and received among a plurality of communication nodes connected via a communication network (communication line) of an asynchronous transfer mode (ATM) etc.

2. Description of the Related Art

There are cases where time code data indicating a connecting point (IN point, OUT point, editing point) etc. of the audio and/or video are added to the audio and/or video data (source data) per se so as to facilitate the editing etc. An editing apparatus monitors the time code data of the audio and/or video data generated (reproduced) by a video tape recorder (VTR) apparatus and controls the VTR apparatus according to the editing points (time code data) of the audio and/or video data designated by the editor to make the VTR apparatus reproduce and record the audio and/or video data.

Further, recently, an asynchronous transfer mode (ATM) system has been put into practical use as a high speed digital data transmission system. Application to the transmission of audio and/or video data by the ATM system is being studied.

Therefore, there is a demand for connecting an editing apparatus and a VTR apparatus via a communication network such as an ATM communication network and controlling the VTR apparatus from the editing apparatus via the communication network so as thereby to edit the audio and/or video data. In order to perform such remote editing, the editing apparatus must transmit the control data for the VTR apparatus to the VTR apparatus via the communication network, and the VTR apparatus must reproduce the audio and/or video data according to the sent control data. Further, the reproduced audio and/or video data and time code data must be transmitted to the editing apparatus again via the communication network, and the editing apparatus must perform the editing based on the received audio and/or video data and time code data and record the same.

However, a transmission delay is produced while the data is transmitted to the opposite side via the communication network. For example, there is a possibility that the transmission delay will change along with the elapse of time due to the state of congestion etc. of the communication network in the ATM communication network and therefore when the time code data and the audio and/or video data are separately transmitted, a "time lag" will sometimes be produced between the time code data and the audio and/or video data received by the editing apparatus. When a time lag is produced between the time code data and the audio and/or video data in this way, the audio and/or video data cannot be connected at the correct timing and correct editing will become difficult.

On the other hand, time code data referred to as a "virtual interval time code (VITC)" is inserted in the vertical retrace line period of the audio and/or video data as part of the source data, so it may also be considered to use the VITC for the remote editing. This VITC has a characteristic feature that the audio and/or video data can be read also at the time of "still reproduction" when the audio and/or video data is being reproduced by the VTR apparatus in a freeze state.

However, where the audio and/or video data do not contain a VITC or contain an erroneous VITC, if the remote editing is carried out with respect to such audio and/or video data, only incorrect editing can be carried out.

SUMMARY OF THE INVENTION

An object of the present invention is to provide a data processing system with which correct editing can be carried out by using an editing apparatus and a VTR apparatus connected via a communication network.

Further, another object of the present invention is to provide a data processing system in which no deviation is produced between the audio and/or video data and the time code data received on the editing apparatus side even if the remote editing is carried out by using an editing apparatus and a VTR apparatus connected via a communication network.

Further, still another object of the present invention is to provide a data processing system with which correct editing can be carried out also with respect to audio and/or video data not containing a VITC or containing an erroneous VITC by using the time code data contained in the transmission packet.

According to the present invention, there is provided a data processing system for transmitting audio data and video data or one of the same (audio and/or video data) between a first data processing apparatus and a second data processing apparatus connected to each other via a predetermined communication network by using a predetermined transmission packet, the first data processing apparatus having a data generating means for generating the audio and/or video data and time code data or acknowledgement data of the audio and/or video data, a first multiplexing means for multiplexing the generated audio and/or video data and the time code data or the acknowledgement data in the transmission packet, a first demultiplexing means for disassembling the data in the transmission packet transmitted from the second data processing apparatus via the communication network and demultiplexing a control command with respect to the data generating means, and a first transmitting and receiving means for transmitting the transmission packet data in which the audio and/or video data and the time code data or the acknowledgement data are multiplexed to the second data processing apparatus via the communication network and, at the same time, receiving the transmission packet data transmitted from the second data processing apparatus; the second data processing apparatus having second transmitting and receiving means for receiving the transmission packet data transmitted from the first data processing apparatus via the communication network and, at the same time, transmitting the transmission packet data in which the control command is multiplexed to the second data processing apparatus, a second demultiplexing means for disassembling the received transmission packet data and demultiplexing the audio and/or video data and the time code data or the acknowledgement data, a second multiplexing means for multiplexing the control command with respect to the data generating means in the transmission packet data, and a data processing means for generating the control command and, at the same time, performing a predetermined processing with respect to the demultiplexed audio and/or video data by using the demultiplexed time code data or the acknowledgement data.

Preferably, the data processing means in the second data processing apparatus has a control unit which instructs the generation of the audio and/or video data and generation of the time code data or generation of the acknowledgement data with respect to the first data processing apparatus and has a data processing unit which performs the predetermined processing with respect to the demultiplexed audio and/or video data according to the control based on the time code data from the control unit.

Also, preferably, the second demultiplexing means outputs the audio and/or video data to the data processing unit after the disassembling and demultiplexing processing and selects either data of the time code data or the acknowledgement data in accordance with the control command from the control unit and outputs the same to the control unit.

Preferably, the communication network is a communication network of an asynchronous transfer mode system.

The multiplexing means multiplexes the audio and/or video data and time code data generated by the data generating means in the same transmission packet.

The transmitting means transmits a transmission packet containing the audio and/or video data and the time code data to the data processing apparatus of the reception side via the communication network.

The data processing apparatus on the transmission side transmits the data by including the audio and/or video data and time code data in same transmission packet in this way so as to prevent a deviation due to a transmission delay or the like from being produced between the audio and/or video data and time code data.

In the data processing apparatus on the reception side, the receiving means receives the transmission packet transmitted from the data processing apparatus on the transmission side, and the demultiplexing means demultiplexes the audio and/or video data and time code data from the received transmission packet.

The data processing apparatus performs the editing with respect to the received audio and/or video data by using for example the demultiplexed time code data.

In this way, the data processing apparatus on the reception side performs correct editing etc. by using the audio and/or video data and time code data contained in the same transmission packet and having no time lag from each other for processing.

BRIEF DESCRIPTION OF THE DRAWINGS

The above and other objects and features of the present invention will be become more apparently by the following description with reference to the accompanying drawings, in which:

FIG. 4 is a view of the configuration of a PDU packet used for the data transmission between the editing system and the reproduction system shown in FIG. 1;

DESCRIPTION OF THE PREFERRED EMBODIMENTS

Below, preferred embodiments of the present invention will be explained.

The configuration of a data editing system 1 according to an embodiment of the present invention will be explained by referring to FIG. 1 to FIG. 3.

Figure 1:
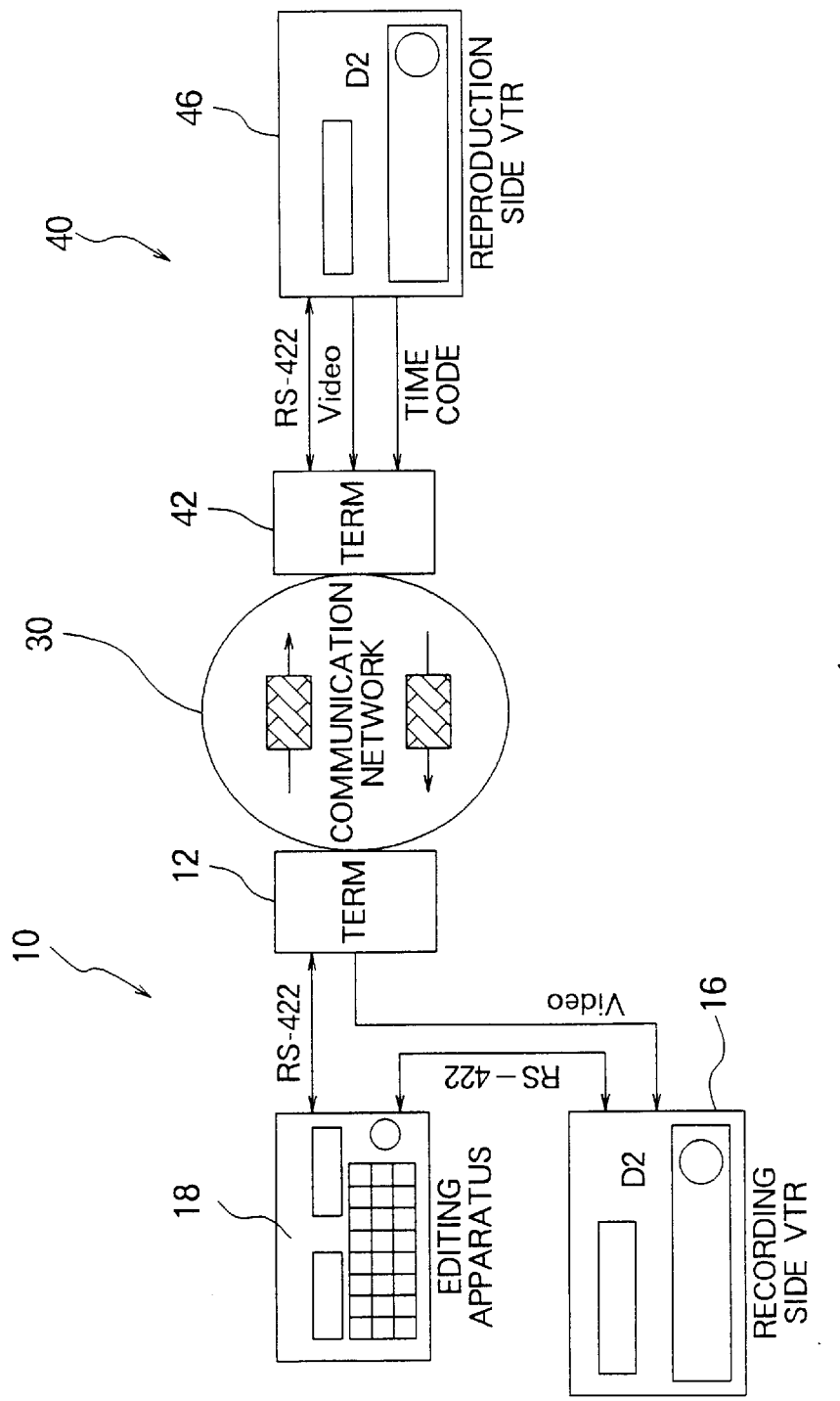
FIG. 1 is a view of the configuration of a data editing system according to the present invention.

FIG. 1 is a view of the configuration of the data editing system 1 of the embodiment according to the present invention.

As shown in FIG. 1, the data editing system 1 is comprised of an editing system 10 as a first data processing apparatus and a reproduction system 40 as a second data processing apparatus connected via a communication network 30 of the ATM communication system.

The editing system 10 is constituted by an editing apparatus 18 and a recording side VTR apparatus 16 and terminal equipment (TERM) 12.

The reproduction system 40 is constituted by a reproduction side VTR apparatus 46 and terminal equipment 42.

The data editing system 1, through these constituent parts, realizes remote editing where the audio and/or video data reproduced by the VTR apparatus 46 of the reproduction system 40 controlled by the editing apparatus 18 is transmitted via the communication network 30 to the editing system 10 via the communication network 30 and the editing is performed by the editing apparatus 18.

In the data editing system 1, the communication network 30 is an ATM communication network of for example the AAL1 protocol and transmits the data between the editing system 10 and the reproduction system 40. Note that, the communication network 30 gives a predetermined transmission delay to the data transmitted between the editing system 10 and the reproduction system 40.

The ATM is a transmission system not dependent upon the communication media. On the other hand, the communication characteristics necessary for the provision of various communication services such as audio and/or video data are different in various ways. It is a basic function of an ATM adaptation layer (AAL) to ensure a match between an ATM layer and lower layers common to the communication service and an upper layer dependent upon the service. CCITT recommendations I.362, I.363, and I.365, I.365.1 prescribe service functions and detailed specifications of four types of protocol.

One of them is the AAL1 protocol. The AAL1 protocol is an adaptation layer protocol envisioning provision of a constant baud rate (CBR) type of service such as conventional audio communication and already existing dedicate line services.

Note that, as the protocol of the communication network 30, other than the AAL1 protocol, use of an AAL5 protocol etc. having synchronization data can be considered in the future.

The AAL5 protocol is an adaptation layer protocol which is being studied and newly proposed among mostly computer equipment vendors with the aim of more efficient transfer mainly for data communication.

Further, from the communication network 30 to the editing system 10 and reproduction system 40, a line clock NCLK (19.44 (155.52/8 MHz)) used when dividing the frequency of a clock (155.52 MHz) corresponding to the data rate of the AAL protocol and processing an ATM cell (a block containing digitalized transmission data divided into sections each having a predetermined length; the data being transferred in the network by using this cell as a unit) as eight-bit parallel data is supplied. On the other hand, inside the editing system 10 and reproduction system 40, an internal clock 4fsc used when performing transmission by a serial digital interface (SDI) system is about 14.3 MHz. Where they are correct, it is possible approximate frequencies of these clocks with a whole number ratio (NCLK: 4fsc=1188:875) with a high precision.

Here, the SDI system is a signal transmission system for transmitting audio and video data of a digital format between apparatuses used for video editing etc. The signal format thereof is standardized to the standard SMPTE-295M of the Society of Motion Picture and Television Engineers (SMPTE) as the standard of video data/audio data of a digital format. The SDI system is used for the transmission of audio and/or video data of a digital format of the D1 system which is a component video format and the composite video format D2 system. The transmission speed thereof is high, i.e., 270 MHz.

In the editing system 10, the editing apparatus 18 has two remote (REMOTE) terminals for transmitting and receiving time code data and control data of the RS-422 protocol with and the VTR apparatus 46 of the reproduction system 40 and with the VTR apparatus 16 via the communication network 30.

The editing apparatus 18 generates two sets of RS-422 control data for controlling the operations of the VTR apparatus 46 of the reproduction system 40 and the VTR apparatus 16 in accordance with the operation of the editor and outputs them from two REMOTE terminals to a REMOTE terminal of the VTR apparatus 16 and an RS-422 interface circuit 120 (FIG. 2) of the terminal equipment 12.

The VTR apparatus 16 has a REMOTE terminal for transmitting and receiving the control data with the editing apparatus 18 and an input terminal (VIDEO) for receiving the audio and/or video data transmitted from the VTR apparatus 46 of the reproduction system 40 via the communication network 30.

The VTR apparatus 16 records the audio and/or video data input from the terminal equipment 12 to the input terminals (VIDEO_IN, AUDIO_IN, SDI_IN (SMPTE-259M; Serial Digital Interface), etc.) according to the control data input to the REMOTE terminal.

In the reproduction system 40, the VTR apparatus 46 has a TIME_CODE (TIME_CODE_OUTPUT) terminal for transmitting and receiving the time code data with the editing apparatus 18 of the editing system 10 via the communication network 30, a REMOTE terminal for transmitting and receiving the control data and an output terminal (VIDEO) for outputting the audio and/or video data to the VTR apparatus 16 of the editing system 10 via the communication network 30.

The VTR apparatus 46 reproduces the audio and/or video data according to the control data input to the REMOTE terminal and outputs the same from the output terminal (VIDEO_OUT, AUDIO_OUT) to the terminal equipment 42.

Also, the VTR apparatus 46 reads a longitudinal time code (LTC) recorded in a longitudinal direction of the video tape, generates the time code data, and outputs the same from the TIME_CODE terminal to the terminal equipment 42 according to the control data.

Figure 2:
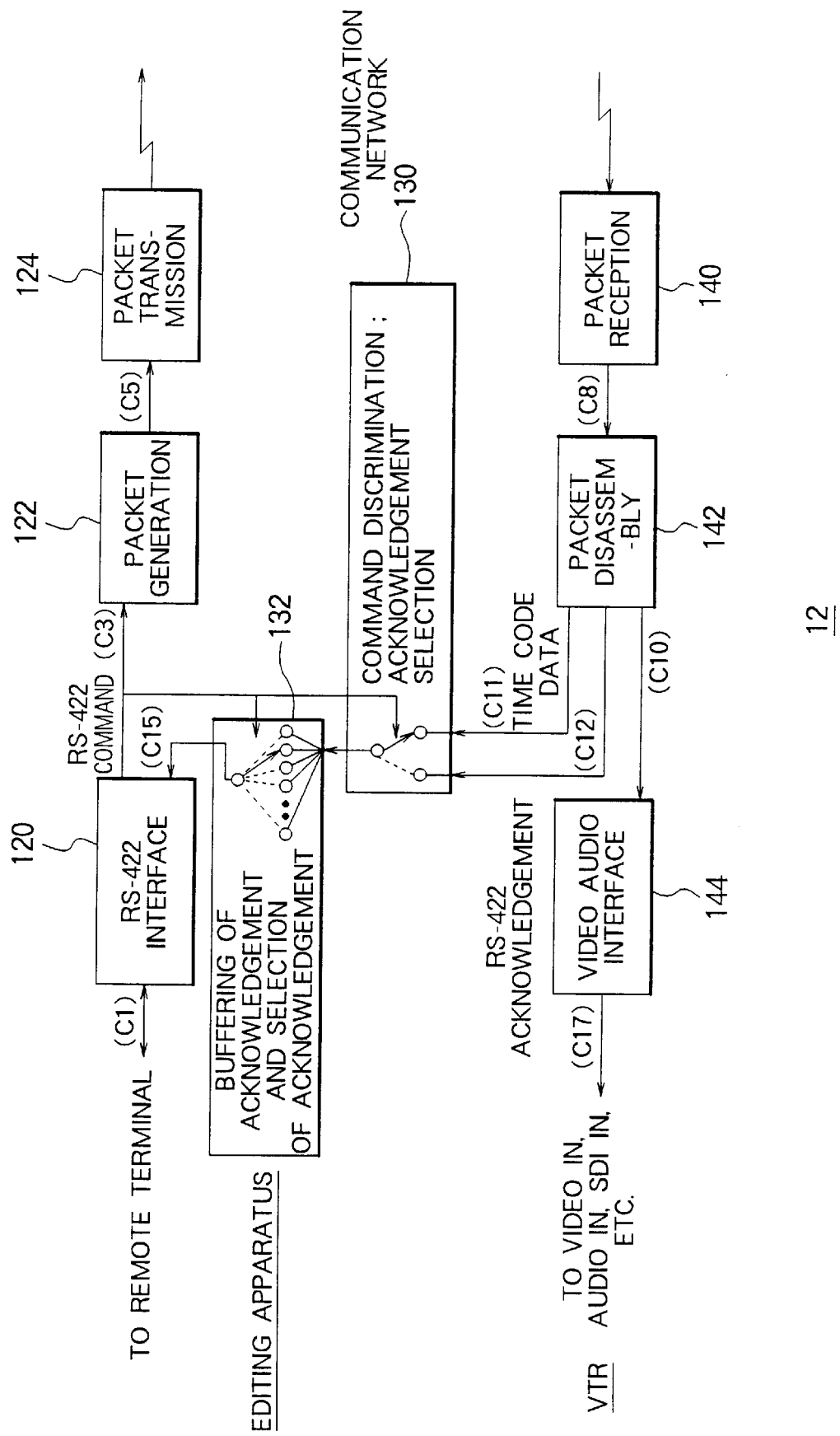
FIG. 2 is a view of the configuration of a terminal equipment of the editing system shown in FIG. 1.

FIG. 2 is a view of the configuration of the terminal equipment 12 shown in FIG. 1.

As shown in FIG. 2, the terminal equipment 12 is constituted by an RS-422 interface circuit 120, a packet generation circuit 122, a packet transmission circuit 124, a discrimination and selection circuit 130, a buffering and selection circuit 132, a packet reception circuit 140, a packet disassembly circuit 142, and an interface circuit 144 for audio and/or video data.

The terminal equipment 12 multiplexes the control data input from the editing apparatus 18 in a predetermined transmission packet (protocol data unit (PDU) packet) and transmits the same to the reproduction system 40 via the communication network 30 by these constituent parts. Further, the terminal equipment 12 receives the PDU packet transmitted from the reproduction system 40 via the communication network 30, demultiplexes the audio and/or video data, control data (acknowledgement data), and time code data from the received PDU packet and outputs the same to the VTR apparatus 16 and the editing apparatus 18. Note that, the configuration of the PDU packet will be explained later by referring to FIG. 4.

In the editing apparatus 12, the RS-422 interface circuit 120 receives the control data C1 input from the editing apparatus 18 via the REMOTE terminal and outputs the same to the packet generation circuit 122, the buffering and selection circuit 132, and the discrimination and selection circuit 130 as the RS-422 command C3.

Also, the interface circuit 120 outputs the acknowledgement data etc. from the VTR apparatus 46 of the reproduction system 40 input from the buffering and selection circuit 132 to the REMOTE terminal of the editing apparatus 18.

The packet generation circuit 122 multiplexes the RS-422 command C3 input from the interface circuit 120 in the PDU packet C5 and outputs the same to the packet transmission circuit 124.

The packet transmission circuit 124 transmits the PDU packet C5 input from the packet generation circuit 122 to the communication network 30.

The packet reception circuit 140 receives the PDU packet transmitted from the reproduction system 40 via the communication network 30 and outputs the same as the reception data C8 to the packet disassembly circuit 142.

The packet disassembly circuit 142 disassembles the PDU packet contained in the reception data C8 input from the packet reception circuit 140, demultiplexes the time code data (time code data C11), acknowledgement data (RS-422 acknowledgement C12), and audio and/or video data C10 multiplexed in the PDU packet, and outputs the same to the discrimination and selection circuit 130 and the interface circuit 144.

The interface circuit 144 for the audio and/or video data outputs the audio and/or video data C10 input from the packet disassembly circuit 142 to the input terminal (VIDEO_IN, AUDIO_IN) of the editing apparatus 18 or outputs the same to the input terminal (SDI_IN) of the transmitting apparatus of SDI system if the transmitting apparatus of SDI system is connected.

The discrimination and selection circuit 130 selects either of the time code data C11 or the RS-422 acknowledgement C12 in accordance with the contents of the RS-422 command input from the interface circuit 120 and outputs the same to the buffering and selection circuit 132.

That is, the discrimination and selection circuit 130 discriminates the control data C1 (RS-422 command C3) input from the editing apparatus 18, selects the time code data C11 demultiplexed by the packet disassembly circuit 142 where the control data C1 is the time code sense command requesting the transmission of the time code data to the VTR apparatus 46 of the reproduction system 40, and selects the RS-422 acknowledgement C12 where the control data is another command, and outputs the same to the buffering and selection circuit 132.

The buffering and selection circuit 132 buffers the data input from the discrimination and selection circuit 130 and outputs the time code data C11 and the RS-422 acknowledgement C12 to the interface circuit 120 as the selected data C15 in accordance with the contents of the RS-422 command.

Further, the buffering and selection circuit 132 has also the following function. The editing apparatus 18 starts exception processing (time out processing) if it does not receive the acknowledgement data within a predetermined time after issuing the control data to the terminal equipment 12. In this case, when receiving the control data concerning the time out processing from the editing apparatus 18, the terminal equipment 12 quasi-returns the acknowledgement data to the editing apparatus 18 and performs time out avoidance processing for preventing the editing apparatus 18 from performing the time out processing. The contents of the time out avoidance processing will be explained later by referring to FIG. 3.

Figure 3:
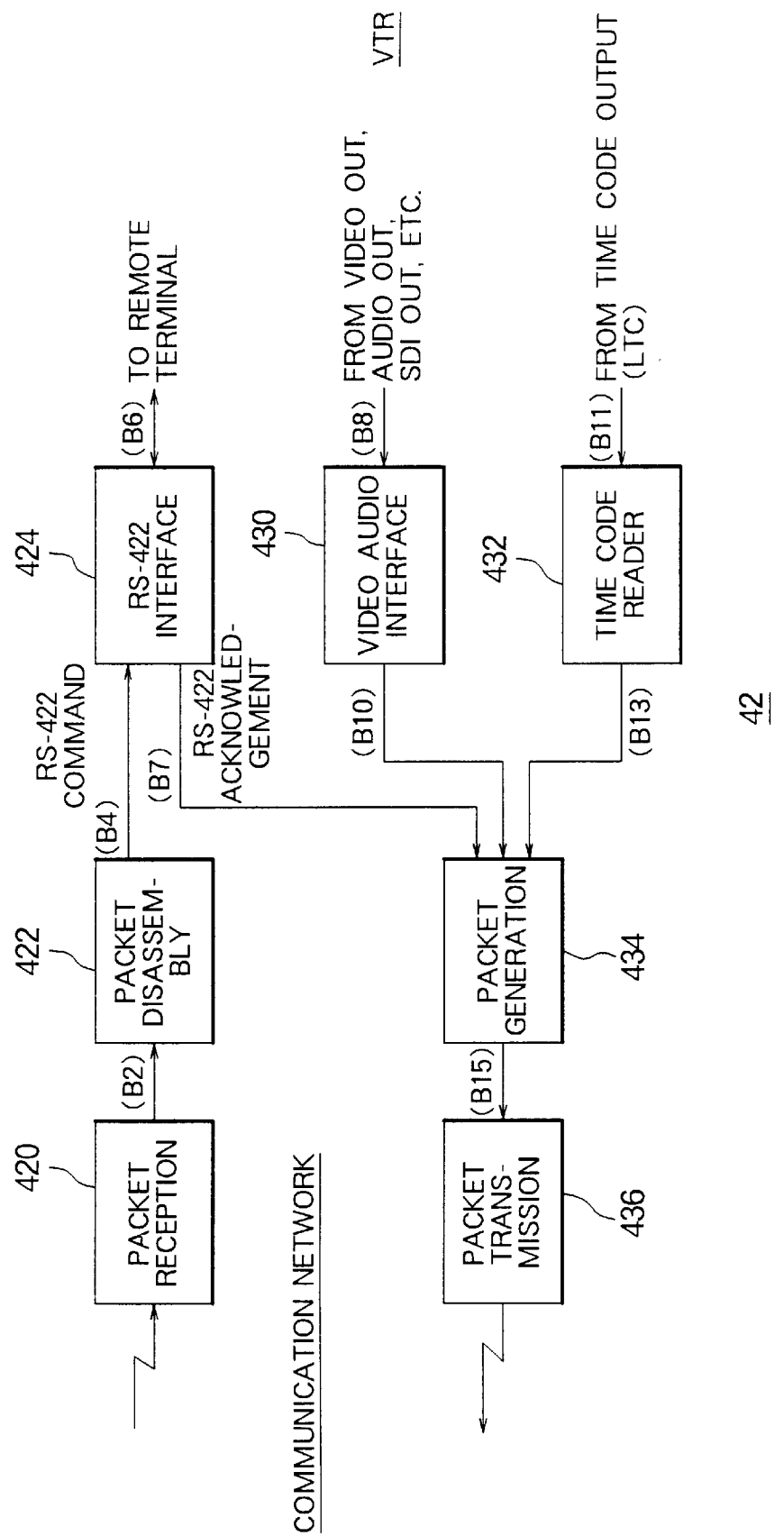
FIG. 3 is a view of the configuration of the terminal equipment of the reproduction system shown in FIG. 1.

FIG. 3 is a view of the configuration of the terminal equipment 42 shown in FIG. 1.

As shown in FIG. 3, the terminal equipment 42 is constituted by a packet receiving circuit 420, a packet disassembly circuit 422, an RS-422 interface circuit 424, an interface circuit 430 for audio and/or video data, a time code reader 432 for reading the time code data, a packet generation circuit 434, and a packet transmission circuit 436.

The terminal equipment 42 multiplexes the acknowledgement data and audio and/or video data input from the VTR apparatus 46 in the PDU packet by these constituent parts and transmits the same to the editing system 10 via the communication network 30. Further, the terminal equipment 42 receives the PDU packet transmitted from the editing system 10 via the communication network 30, demultiplexes the control data from the received PDU packet, and outputs the same to the VTR apparatus 46.

Note that, the terminal equipments 12 and 42 frequently have the same configuration in practice, but for clarification of the illustrated explanation, the part related to the data processing of the terminal equipment 12 in the editing system 10 is shown in FIG. 2, and the part related to the data processing of the terminal equipment 42 in the reproduction system 40 is shown in FIG. 3.

The packet reception circuit 420 receives the PDU packet transmitted from the editing system 10 via the communication network 30 and outputs the same as the received data B2 to the packet disassembly circuit 422.

The packet disassembly circuit 422 disassembles the PDU packet contained in the received data B2 input from the packet reception circuit 420, demultiplexes the control data (RS-422 command B4), and outputs the same to the interface circuit 424.

The interface circuit 424 receives the acknowledgement data input from the REMOTE terminal of the VTR apparatus 46 and outputs the same as the RS-422 acknowledgement B7 to the packet generation circuit 434. Further, the interface circuit 424 outputs the RS-422 command B4 input from the packet disassembly circuit 422 to the REMOTE terminal of the VTR apparatus 46.

The interface circuit 430 receives the audio and/or video data B8 input from the output terminal of the audio and/or video data of the VTR apparatus 46 and outputs the same to the packet generation circuit 434 (audio and/or video data B10).

The time code reader 432 receives the time code information B11 input from the TIME_CODE terminal of the VTR apparatus 46 and outputs the same as the time code data B13 to the packet generation circuit 434.

The packet generation circuit 434 assembles the RS-422 acknowledgement B7, the audio and/or video data B10, and the time code data B13 respectively input from the interface circuits 424 and 430 to the PDU packet B15 and outputs the same to the packet transmission circuit 436.

The packet transmission circuit 436 transmits the PDU packet B15 to the editing system 10 via the communication network 30.

Next, an explanation will be made of the configuration of the PDU packet used for the data transmission between the editing system 10 and the reproduction system 40.

FIG. 4 is a view of the configuration of the PDU packet used for the data transmission between the editing system 10 and the reproduction system 40 shown in FIG. 1.

In the PDU packet, the data TRS has FFh, 00h, 00h (h is a hexadecimal indication) as contents and indicates the header position of the PDU packet. Note that, in the data TRS, the ancillary data (ANC) region, and the video data (VIDEO) region, it is prohibited that the data contained in the PDU packet take the value of 00h or FFh except the data inserted at intervals of 5 bytes.

By detecting this data TRS, it can be discriminated that the subsequent data is data of a PDU packet. Accordingly, the PDU packet having an ancillary data region and video data region of any data length can be processed not in the units of the payload portion (data part containing the transmission data to be transferred) of the ATM cell.

In the data RTS1 and RTS2 are respectively placed synchronization data RTS taking a value of 6 bits obtained by subtracting 832 from a count value of the internal clock $4f_{SC}$ during 1188 cycles of an external clock NCLK. Note, the transmission packet is transmitted for a time of an amount of 910 cycles of the internal clock 4f, and therefore there is a possibility that two count values will appear during a period where one transmission packet is transmitted. Two regions of data RTS1 and RTS2 are secured for dealing with such a case. As a method of synchronization using this synchronization data RTS, a synchronous residual time stamp (SRTS) method etc. have been known.

Figure 5:
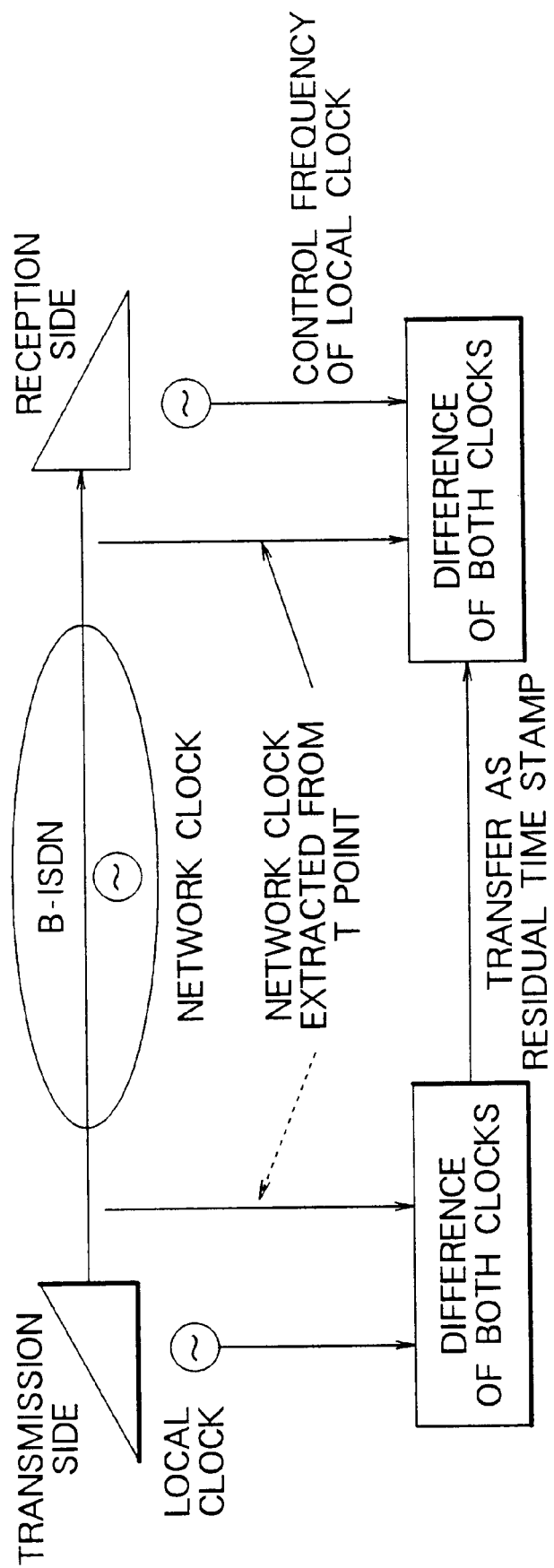
FIG. 5 is a view of the concept of an SRTS method.

Below, an explanation will be made of the SRTS method. FIG. 5 is a view showing the concept of the SRTS method. A method of transferring the clock frequency on the transmission side to the reception side when the clocks of the transmission side and reception side are not synchronized on the network will be referred to as a "source clock frequency reproduction method". As the AAL1 type 1 of this "source clock frequency reproduction method", there are the SRTS method and adaptation clock method.

Which method is to be used depends upon the required service conditions. Where for example an asynchronous 1.544 Mbit/s or 2.048 Mbit/s system signal is transferred by the line signal transfer service, the SRTS method is necessary for satisfying the jitter condition of CCITT recommendations G.823 and G.824.

In the SRTS method, the reference clock must be commonly obtained at both ends (T points) of the network as shown in FIG. 4. On the transmission side, a difference between a common reference clock and a local clock in the transmission terminal is counted, and this is transferred to the reception side as a residual time stamp (RTS). The AAL type 1 transfers the RTS by using the CS display bit. On the reception side, a difference between the common reference clock and RTS is sought, and the local clock frequency in the receiving terminal is controlled by this.

On the other hand, the adaptation clock method is for matching the frequency of the local clock to the frequency on the transmission side by controlling the reception data fetching clock frequency so that the remaining amount of the data inside the buffer is located near the middle of the buffer size on the reception side and there is no information transfer between the transmission side and the reception side. When comparing the SRTS method and the adaptation clock method, the SRTS method is more complicated than the adaptation clock method, but the realized jitter performance etc. are better than the adaptation clock method.

The data RTRS1 and RTS2 are used for establishment of synchronization between communication networks in the editing system 10. Note that a valid bit V (Valid) is used as the sixth bit of the data RTS1 and RTS2. The content of the valid bit V becomes a logical value 1 where these data are valid, while becomes a logical value 0 where they are not valid. Further, in order to avoid the value of the data being 00h and FFh, a logic inverted value of the valid bit V is added as a seventh bit.

The data LNID (Line Number ID) is used for the discrimination of the audio and/or video data of the transmission data contained in the ancillary data region and the video data region in the same PDU packet. The 0-th to second bits indicate field numbers (FN) indicating the fields in which the audio and/or video data are contained, and the third to seventh bits taking values of 0 to 31 indicate line numbers (LN) indicating lines in which the audio and/or video data are contained.

The data LN1 takes a value within a range of from 1 to 525 and is used for the discrimination of the audio and/or video data within the range of two fields together with the data LNID1. The 0-th to fourth bits and fifth to ninth bits of numerical values to be stored are used for the 0-th to fourth bits of the first byte and second byte of the data LN1, and the logic inverted value of the fourth bit is used as each fifth bit of the data LN1 for the same reason as that for the valid bit V of the data RTS1 and RTS2.

The data LNID2 and LN2 are used where the reproduction system 40 compensates for the transmission delay time produced in the transmission data (transmission packet) in the communication network 30 or the like where the time when the editing system 10 processes the transmitted transmission data is determined, for example, where the received transmission data is used for a program being broadcast in real time.

That is, the data LNID2 and LN2 show by how many lines the reproduction of the audio and/or video data contained in the same PDU packet by the VTR apparatus 16 and the transmission by the terminal equipment 42 are made earlier for the compensation of the transmission delay time in a television broadcast office etc. on the transmission side. Note that the details of the contents of the data LNID2 and LN2 are the same as those of the data LNID1 and LN1 mentioned above, respectively.

In the data Flag, a packet table (PT) data indicating the amount of data of the ancillary data portion and video data portion are used for the 0-th third bits. Bits sb0 to sb3 are used for into the fourth to seventh bits. These bits sb0 to sb3 are used for transferring the shuffling system of the encoder side.

The data RS422-ch1 and RS422-ch2 are used for the transmission of the data etc. for control using the RS422 between audio and/or video data processing apparatuses 14 connected to the data transmitting apparatuses on the transmission side and reception side (editing system 10 and reproduction system 40).

Either of the upper four bits or the lower four bits of the data to be transmitted are used for the 0-th to third bits of the data RS422-ch1 and RS-422-ch2. A bit UL (Upper/Lower) which becomes 1 when the data used for the 0-th to third bits are the upper four bits and becomes 0 when the data is the lower four bits is used for the fourth bit. A logic inverted value of the fourth bit is used for the fifth bit for the same reason as that for the valid bit V of the data RTS1 and RTS2.

Further, a valid bit V indicating whether the data RS-422-ch1 and RS-422-ch2 are valid is added to the sixth bit.

An audio data used for connection etc. enters into the data VOICE. The audio data can be sampled by a sampling frequency almost equal to the sampling frequency of the PCM coding device used for example for general telecommunication, and in addition one set each consisting of 8 bits is generated for every 2 cycles of horizontal synchronous signal (15.75 KHz) of the video signal so that it can be easily inserted into the PDU packet in terms of timing. Accordingly, one set of audio data will be transmitted over two PDU packets, one PDU packet being generated for every cycle of the horizontal synchronous signal. Note that, in the case shown in FIG. 4, the upper four bits or lower four bits of the audio data are placed in the 0-th to third bits of the data VOICE.

Further, a bit UL indicating whether the data of the 0-th to third bit is the upper four bits or lower four bits is place in the fourth bit similar to the data RS-422-ch1 and RS-422-ch2, a logic inverted value of the fourth bit is placed in the fifth bit for the same reason as that for the valid bit V of the data RTS1 and RTS2, and further a valid bit V indicating whether or not the audio data is valid is added.

Further, bits 8F1 and 8F2 used for measuring the delay time given to the PDU packet by an internal portion of the data transmitting apparatus (editing system 10 and the reproduction system 40) and communication network 30 are used for the sixth and seventh bits. Note that, the data to be inserted into the data LNID2 and LN2 are calculated based on the delay time measured by using these bits 8F1 and 8F2.

Reserve data is placed in the region which is made empty as a reserve for the case where other purposes arise in the future. The logic inverted value of the sixth bit is inserted into the seventh bit so that the value becomes neither 00h nor FFh similar to the data RTS1 and RTS2.

Error correction codes of the preceding data regions are inserted into the data CRCC1, CRCC2, and CRCC3. Note that, similar to the data RTS1 and RTS2, the logic inverted value of the sixth bit is inserted into the seventh bit so that the value becomes neither 00h nor FFh similar to the data RTS1 and RTS2.

Note that, the data TRS to reserve data are very small in terms of amounts of data in comparison with the ancillary data region and the video data region, therefore they do not exert an influence upon the throughput of the data transmission.

The word length of the ancillary data region is for example 69 words. AES/EBU data with a word length converted corresponding to each line unit of the audio and/or video data of the D2 system is placed there. For example, where the AES/EBU data of 55 words is converted to 8 bits, 8 bit parallel data obtained as a result of conversion become 68 bits and 6 bits.

In such a case, the 2 bit value "01" or "10" is inserted into the above remaining 2 bits so as to prevent the generation of prohibited codes (00h, FFh). The "01" or "10" is cancelled when the PDU packet is reproduced at the data transmitting apparatus (editing system 10) on the reception side.

Note that, in this region, the order of the AES/EBU data becomes lower words in a forward direction of the PDU packet and upper words in a backward direction.

Data mainly concerning the picture in the video data which has the word length of the one-word 10-bit configuration adapted to the SDI system or the one-word eight-bit configuration adapted to the communication network 30 is placed into the video data region in units of lines of the video data of the D2 system. Note that, the order of the video data becomes a lower byte in the forward direction of the PDU packet and upper byte in the backward direction.

Note that, the ancillary data region and video data region of the PDU packet have a variable length, and there also exists a case where these regions do not contain valid data. Further, the data RS-422-ch1, VOICE, etc. have a valid bit V, therefore this means that, for example, where only the valid data V of the data VOICE is 1 and the valid data V of the other data is 0, only the data VOICE is valid and all of the other data are invalid.

Below, an explanation will be made of the operation of the data editing system 1.

First, the editing apparatus 18 of the editing system 10 generates the control data instructing the reproduction of the audio and/or video data to the VTR apparatus 46 of the reproduction system 40 and outputs the same to the terminal equipment 12 in accordance with the operation of the editor.

The terminal equipment 12 multiplexes the control data (control command) input from the editing apparatus 18 on the data RS-422-ch1 and RS-422-ch2 (below, described as data RS-422) of the PDU packet (FIG. 4) and transmits the same to the terminal equipment 42 of the reproduction system 40.

Note that, at this time, the buffering and selection circuit 132 of the terminal equipment 12 performs the processing for returning the acknowledgement data (ACK) indicating that it received the system control command with respect to the editing apparatus 18 so as to prevent the editing apparatus 18 from performing the time out processing.

The terminal equipment 42 of the reproduction system 40 receives the PDU packet sent from the terminal equipment 12 of the editing system 10, demultiplexes the system control command from the data RS-422, and outputs the same to the VTR apparatus 46.

The VTR apparatus 46 reproduces the audio and/or video data according to the input system control command and outputs the acknowledgement data with respect to the reproduced audio and/or video data and system control command to the terminal equipment 42.

The terminal equipment 42 multiplexes the audio and/or video data input from the VTR apparatus 46 in the video data region and ancillary data region of the PDU packet, multiplexes the acknowledgement data with respect to the RS-422 command output to the VTR apparatus 46 on the data RS-422, and if necessary, multiplexes the time code data input from the VTR apparatus 46 in the reserve data region and transmits the same to the terminal equipment 12 of the editing system 10 via the communication network 30.

The terminal equipment 12 of the editing system 10 receives the PDU packet transmitted from the reproduction system 40 and demultiplexes the acknowledgement data and audio and/or video data. Further, the terminal equipment 12 outputs the audio and/or video data to the VTR apparatus 16 and, at the same time, outputs the predetermined data in accordance with the contents of the acknowledgement data to the RS-422 terminal of the editing apparatus 18.

Further, the editing apparatus 18 controls the VTR apparatus 16 and makes this record the audio and/or video data transmitted from the VTR apparatus 46 of the reproduction system 40.

Further, the editing apparatus 18 of the editing system 10 generates the control data (time code sense command) indicating the request of transmission of time code data with respect to the VTR apparatus 46 of the reproduction system 40 according to need and outputs the same to the terminal equipment 12.

The terminal equipment 12 multiplexes the time code sense command input from the editing apparatus 18 on the data RS-422 of the PDU packet and transmits the same to the terminal equipment 42 of the reproduction system 40. Further, the terminal equipment 12 performs the time out avoidance processing with respect to the editing apparatus 18.

The terminal equipment 42 of the reproduction system 40 receives the PDU packet sent from the terminal equipment 12 of the editing system 10, demultiplexes the time code sense command from the data RS-422, and outputs the same to the VTR apparatus 46. Note that, also commands other than the time code sense command are contained in the data multiplexed on the data RS422.

The VTR apparatus 46 outputs the time code data, that is, the reproduced LTC, and the acknowledgement data with respect to system control command to the terminal equipment 42 in addition to the audio and/or video data during reproduction, according to the input control data.

The terminal equipment 42 multiplexes the audio and/or video data input from the VTR apparatus 46 in the video data region and ancillary data region of the PDU packet as mentioned above and multiplexes the acknowledgement data on the data RS-422, sequentially multiplexes the time code data from the LTC in the reserve data region, and transmits the same to the terminal equipment 12 of the editing system 10.

The terminal equipment 12 of the editing system 10 receives the PDU packet transmitted from the reproduction system 40 and demultiplexes the acknowledgement data and time code data from the data RS422 and reserve data region of the packet, respectively.

Further, the terminal equipment 12 outputs the acknowledgement data or the time code data corresponding to the command from the editing apparatus 18 to the editing apparatus 18.

Particularly, where the time code sense command is input from the editing apparatus 18, the terminal 12 outputs the time code data demultiplexed from the PDU packet to the editing apparatus 18 as the acknowledgement data with respect to the time code sense command. The editing apparatus 18 receiving the acknowledgement data and time code data controls the VTR apparatus 16 by using these data, interrupts, continues, or restarts the recording of the audio and/or video data input to the VTR apparatus 16, and thereby performs the editing.

Figure 6:
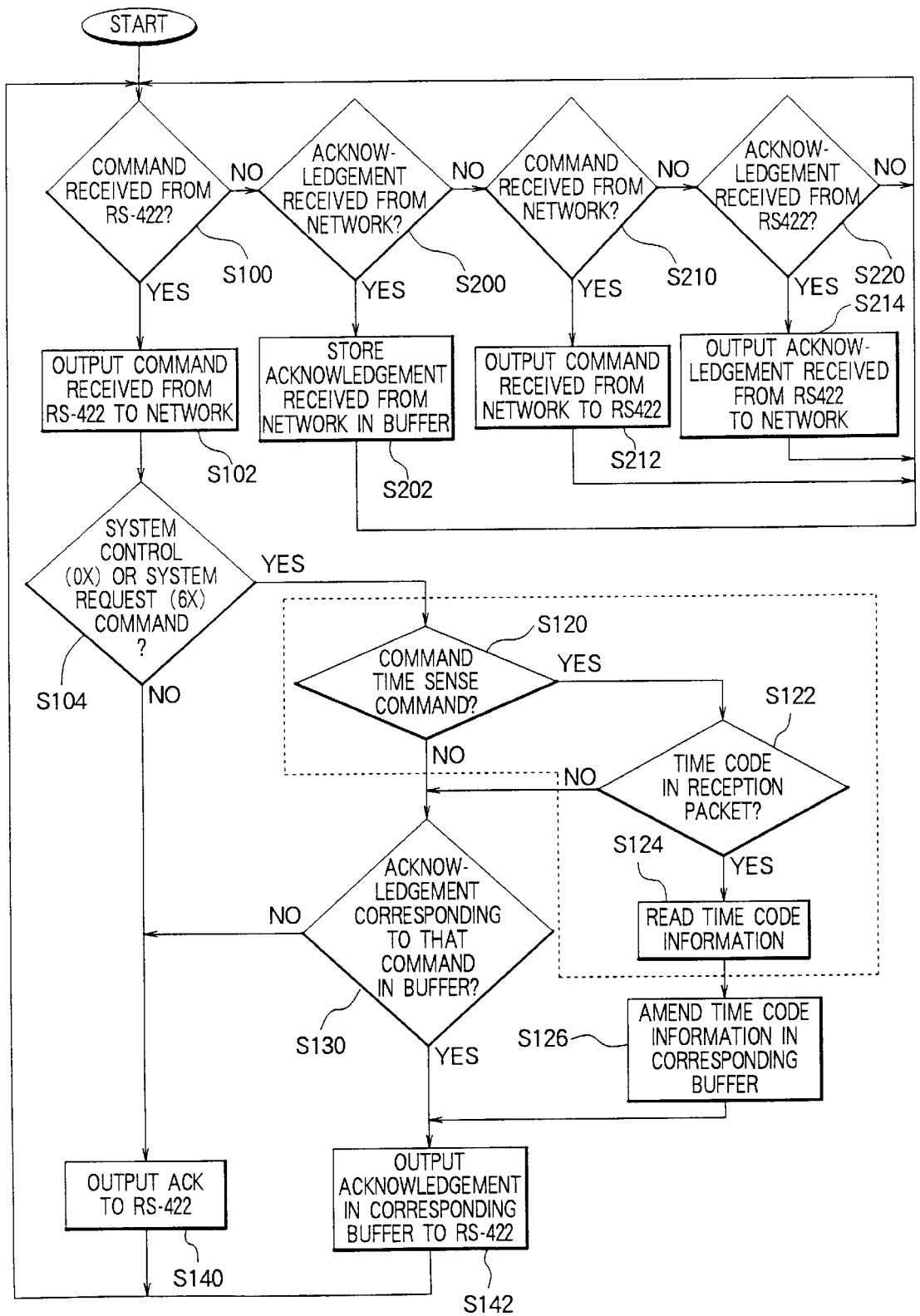
FIG. 6 is a flowchart explaining the processing of the terminal equipment of the editing system shown in FIG. 1.

FIG. 6 is a flowchart for explaining the processing of the terminal equipment 12 shown in FIG. 1. Note that, FIG. 6 shows a processing of the case where the terminal equipment 12 is constituted so that the transmission and reception of the audio and/or video data in two directions between the editing system 10 and the reproduction system 40 are possible.

At step 100 (S100), it is decided whether or not the terminal equipment 12 receives the control data (command data: Command) such as a system control command from the editing apparatus 18. Where it received the command data, the operation routine proceeds to the processing of S102, and where it does not receive the command data, the operation routine proceeds to the processing of S200.

At step 200 (S200), it is decided whether or not the terminal equipment 12 received the acknowledgement data (acknowledgement) from the reproduction system 40 via the communication network 30. Where it received the acknowledgement data, the operation routine proceeds to the processing of S202, while where it does not receive the acknowledgement data, the operation routine proceeds to the processing of S210.

At step 202 (S202), the terminal equipment 12 stores (buffers) the received acknowledgement data in the buffer.

At step 210 (S210), it is decided whether or not the terminal equipment 12 received the command data from the reproduction system 40 via the communication network 30. Where it received the command data, the operation routine proceeds to the processing of S212, and where it does not receive the command data, the operation routine proceeds to the processing of S220.

At step 212 (S212), the terminal equipment 12 outputs the received command data to the reproduction use VTR apparatus (not illustrated) connected to the editing system 10 side.

At step 220 (S220), a decision of whether or not the terminal equipment 12 received the acknowledgement data from the reproduction use VTR apparatus (RS-422) on editing system 10 side is carried out. Where it received the acknowledgement data, the operation routine proceeds to the processing of S214, and where it does not receive the acknowledgement data, the operation routine returns to the processing of S100.

At step 214 (S214), the terminal equipment 12 outputs the received acknowledgement data to the reproduction system 40.

At step 102 (S102), the terminal equipment 12 transmits the command data received from the editing apparatus 18 to the reproduction system 40.

At step 104 (S104), the terminal equipment 12 decides whether the command data is a system control command (SYSTEM_CONTROL) or sense request command (SENSE_REQUEST). Where it is the system control command or sense request command, the operation routine proceeds to the processing of S120, and where it is a command other than them (PLAY, STOP, etc.), the operation routine proceeds to the processing of S140.

At step 120 (S120), the terminal equipment 12 decides whether or not the command data is the time code sense command (Time Sense). Where it is the time code sense command, the operation routine proceeds to the processing of S122, and where it is not the time code sense command, the operation routine proceeds to the processing of S130.

At step 122 (S122), the terminal equipment 12 decides whether or not there is time code data in the command data buffered in the buffering and selection circuit 132. Where there is time code data, the operation routine proceeds to the processing of S124, and where there is no time code information, the operation routine proceeds to the processing of S130.

At step 124 (S124), the terminal equipment 12 reads the time code data (C11) (disassembles the same from the packet).

At step 126 (S126), the time code data (C11) is buffered in the buffering and selection circuit 132 and selected there as the selected data (C15) in place of the RS-422 acknowledgement (C12) with respect to the usual system control command.

At step 130 (S130), the terminal equipment 12 decides whether or not the acknowledgement data corresponding to the command data is buffered in the buffering and selection circuit 132. Where it has been buffered, the operation routine proceeds to the processing of S142, and where it has not been buffered, the operation routine proceeds to the processing of S140.

At step 140 (S140), the terminal equipment 12 returns the ACK signal to the editing apparatus 18. In this way, in the processing of S140, even in a case where there is no acknowledgement data which should be transmitted to the editing apparatus 18, by returning the ACK, it becomes possible to avoid the start of the time out processing of the editing apparatus 18.

At step 142 (S142), the terminal equipment 12 selects the corresponding acknowledgement data (containing the time code data) in the buffer and outputs the same to the editing apparatus 18.

As explained above, in the data editing system 1, the reproduction operation of the VTR apparatus 46 of the reproduction system 40 is controlled via the communication network 30 from the editing apparatus 18 of the editing system 10, and the audio and/or video data can be transmitted and the editing can be applied with respect to the audio and/or video data transmitted by the editing apparatus 18.

Also, in the data editing system 1, it is possible to control the VTR apparatus 46 from the editing apparatus 18 and make the same transmit the time code data, and in addition, the audio and/or video data and the time code data corresponding to this audio and/or video data are multiplexed in the same PDU packet and transmitted, therefore a correct remote editing via the communication network 30 is possible.

Note that, by adding the VTR apparatus 46 by imparting the function of the terminal equipment 42 to the terminal equipment 12 in the editing system 10 and adding the VTR apparatus 16 by imparting the function of the terminal equipment 12 to the terminal equipment 42 in the reproduction system 40, the remote editing can be carried out in two directions also from the side of the reproduction system 40 similar to the editing system 10.

Further, for example, in the editing system 10, it is also possible to constitute the system so that also other processing can be carried out by using other apparatuses, for example, an effecter (special video effect processor) giving a special effect to the audio and/or video data in addition to the editing apparatus 18.

Further, it does not matter whether the constituent parts of the terminal equipments 12 and 42 are constituted in terms of software or constituted in terms of hardware so far as the same function and same performances can be realized.

Further, in the terminal equipment 12, for example, where the transmission delay of the communication network 30 between the editing system 10 and the reproduction system 40 is very small, the time out avoidance processing by the buffering and selection circuit 132 is not indispensable.

As mentioned above, according to the data processing system according to the present invention, it is possible to perform correct editing by using the editing apparatus and VTR apparatus connected via the communication network.

Further, by the data processing system according to the present invention, even if the remote editing is carried out by using the editing apparatus and the VTR apparatus connected via the communication network, no deviation is produced between the audio and/or video data and time code data received on the editing apparatus side.

Further, correct editing can be carried out also with respect to audio and/or video data not containing a VITC or containing an erroneous VITC by using the time code data contained in the transmission packet.

The data processing system of the present invention can be effectively applied when data processing such as editing work of audio and/or video data needs to be efficiently carried out between two data processing apparatuses connected via a communication network.

We claim:

1. A data processing system for transmitting audio data and video data or one of the same (audio and/or video data) between a first data processing apparatus (10) and a second data processing apparatus (40) connected to each other via a predetermined communication network (30) by using a predetermined transmission packet, said first data processing apparatus (10) comprising a data generating means (122) for generating said audio and/or video data and time code data or acknowledgement data of said audio and/or video data, a first multiplexing means (12) for multiplexing said generated audio and/or video data and time code data or acknowledgement data in said transmission packet, a first demultiplexing means (142) for disassembling data in said transmission packet transmitted from said second data processing apparatus via said communication network and demultiplexing a control command with respect to said data generating means, and a first transmitting and receiving means (124) for transmitting said transmission packet data in which said audio and/or video data and said time code data or said acknowledgement data are multiplexed to said second data processing apparatus via said communication network, and receiving said transmission packet data transmitted from said second data processing apparatus;

said second data processing apparatus (40) comprising second transmitting and receiving means (420, 436) for receiving said transmission packet data transmitted from said first data processing apparatus via said communication network and, at the same time, transmitting said transmission packet data in which said control command is multiplexed with respect to said second data processing apparatus, a second demultiplexing means (422) for disassembling said received transmission packet data and demultiplexing said audio and/or video data and said time code data or said acknowledgement data, a second multiplexing means (434) for multiplexing the control command with respect to said data generating means in said transmission packet data, and a data processing means (434) for generating said control command and, at the same time, performing a predetermined processing with respect to said demultiplexed audio and/or video data by using said demultiplexed time code data or acknowledgement data.

2. A data processing system according to claim 1, wherein the data processing means in said second data processing apparatus (40) has:

a control unit which instructs the generation of said audio and/or video data and generation of said time code data or generation of said acknowledgement data with respect to said first data processing apparatus and a data processing unit which performs the predetermined processing with respect to said demultiplexed audio and/or video data according to the control based on the time code data from said control unit.

3. A data processing system according to claim 2, wherein said second demultiplexing means outputs said audio and/or video data to said data processing unit after said disassembling and demultiplexing processing, and selects either data of said time code data or said acknowledgement data in accordance with the control command from said control unit and outputs the same to said control unit.

4. A data processing system according to claim 1, wherein said communication network comprises a communication network of an asynchronous transfer mode system.

* * * * *

UNITED STATES PATENT AND TRADEMARK OFFICE
CERTIFICATE OF CORRECTION

PATENT NO. : 6,026,434
DATED : February 15, 2000
INVENTOR(S) : Kubota et al.

Page 1 of 1

It is certified that error appears in the above-identified patent and that said Letters Patent is hereby corrected as shown below:

Title page,
Item [86], -- § 371 Date: Jun 11, 1997 --

Signed and Sealed this

Twentieth Day of November, 2001

Attest:

*Nicholas P. Godici*

NICHOLAS P. GODICI
*Attesting Officer*   *Acting Director of the United States Patent and Trademark Office*